United States Patent [19]

Pracht

[11] 4,345,378
[45] Aug. 24, 1982

[54] SCISSORS WITH ADJUSTABLE PIVOT

[75] Inventor: Günther Pracht, Solingen, Fed. Rep. of Germany

[73] Assignee: "Jaguar" Stahlwaren Vertriebsgesellschaft mbH & Co. Kommanditgesellschaft, Solingen, Fed. Rep. of Germany

[21] Appl. No.: 212,477

[22] Filed: Dec. 3, 1980

[30] Foreign Application Priority Data

Jun. 20, 1980 [DE] Fed. Rep. of Germany ....... 3023057

[51] Int. Cl.³ .............................................. B26B 13/04
[52] U.S. Cl. ......................................... 30/266; 30/270
[58] Field of Search ................. 30/266, 267, 268, 270, 30/341, 257

[56] References Cited

U.S. PATENT DOCUMENTS

| 624,175 | 5/1899 | Chapman | 30/270 |
| 3,289,296 | 12/1966 | Hedstrom | 30/267 |
| 3,355,200 | 11/1967 | Storch | 30/267 X |
| 3,611,570 | 10/1971 | Laurenti | 30/268 |
| 3,672,053 | 6/1972 | Wiss | 30/267 |
| 4,254,551 | 3/1981 | Megna et al. | 30/341 |

Primary Examiner—Jimmy C. Peters
Attorney, Agent, or Firm—John C. Smith, Jr.

[57] ABSTRACT

A scissors useful particularly by hairdressers comprises a movable scissors blade, a stationary scissors blade and a pivotal connection connecting the blades and consisting of a threaded pin having a shank, a head and a threaded steel nut provided with a projection formed with an annular groove extending over the periphery of the projection. The threaded pin passes with its shank through holes of the blades and is non-rotatably held by one of the scissors blades. A circular recess is provided in the stationary scissors blade and defines a circular wall, the circular wall being arranged to guide the threaded steel nut via the projection thereof. An annular body consisting of resilient material is arranged in the annular groove and engages the projection and the circular wall of the circular recess with contact pressure.

2 Claims, 4 Drawing Figures

SCISSORS WITH ADJUSTABLE PIVOT

BACKGROUND OF THE INVENTION

This invention relates to a scissors, particularly a hairdressers' scissors of the type having between the two blades a pivotal connection consisting of a threaded pin and a steel nut having a projection, the threaded pin being non-rotatably connected to one of the two scissors blades.

In the conventional type of hairdressers' scissors the threaded pin is screwed mechanically into a threaded hole of one of the scissors blades. The thread of the hole is oversized so that the threaded pin is non-rotatably held. Due to this, the scissors blades engage each other with a predetermined pressure. The hairdresser is thereby not able to adjust the operation of the scissors which is dependent on the pressure with which the scissors blades engage each other according to his wish. There is in addition no possibility of readjusting the engaging pressure which decreases when the scissors wear out at the cooperating surfaces adjacent to the threaded pin or at the cutting edges. The conventional locking against rotation as is known in connection with pivotal connections consisting of a threaded pin and a steel nut cannot be used in connection with hairdressers' scissors, since due to the arrangement of a counter nut or a spring washer no sensitive adjustment of the operation of the scissors is possible. In addition, for such a locking against rotation one or two wrenches as well as a screw driver are necessary in order to rotate the nut, which are not always available.

A pivotal connection for scissors consisting of a threaded pin and a nut has, however, already become known from German Utility Model No. 76 09 410, in which the nut consists of plastic material and the thread thereof has a certain undersize so that the nut is seated on the thread of the threaded pin with a certain press fit. The nut additionally comprises an integrally formed smooth resilient rim by means of which it exerts contact pressure upon the neighboring scissors blade. By means of the rim the slope is intended to be compensated which in the case of scissors results from the fact that the scissors blades taper in the direction toward their tips. For such a scissors a loosening of the nut cannot be precluded with certainty because of the known creeping of plastic material under pressure strains.

SUMMARY OF THE INVENTION

It is, therefore, the object of the present invention to provide a locking means which prevents on the one hand the nut of the pivotal connection of the blades of the scissors of the above mentioned type from unintentional rotation, but which on the other hand makes possible a sensitive adjustment of the operation of the scissors.

To attain this object the present invention provides a scissors, in particular a hairdressers' scissors, comprising a movable scissors blade and a stationary scissors blade; a pivotal connection connecting said movable scissors blade and said stationary scissors blade and consisting of a threaded pin having a shank, a head and a threaded steel nut provided with a projection formed with an annular groove extending over the periphery of the said projection, the threaded pin passing with its shank through a hole of the movable scissors blade and a hole of the stationary scissors blade and being non-rotatably held by one of the scissors blades; a circular recess provided in the stationary scissors blade and defining a circular wall, said circular wall being arranged to guide the threaded steel nut via the projection thereof, and an annular body consisting of resilient material which is arranged in said annular groove and engages the projection and the circular wall of the circular recess with contact pressure.

By virtue of the pressure exerted on the projection of the nut by the annular body an unintentional rotating of the nut is prevented with certainty. The contact pressure is rated in such a manner that the operation of the scissors can sensitively be adjusted by rotating the nut.

In accordance with the invention it is advantageous to provide a groove in the front side of the nut.

By means of this measure it is possible to rotate the nut in an improvised manner, e.g. by means of a file for the fingernails, the blade of a pocket-knife or another available tool.

It is, however, already known from the above mentioned German Utility Model to use a cap nut instead of a common nut. The use of a cap nut has, however, disadvantageous effects in the case of a hairdressers' scissors in so far as the hairdresser during his work often has a comb in his hand additionally to the scissors, the cap nut in this case hindering the work of the hairdresser.

BRIEF DESCRIPTION OF THE DRAWING

An embodiment of the invention will now be described by way of example and with reference to the accompanying drawing in which.

DESCRIPTION OF THE PREFERRED EMBODIMENT

Figure 2:
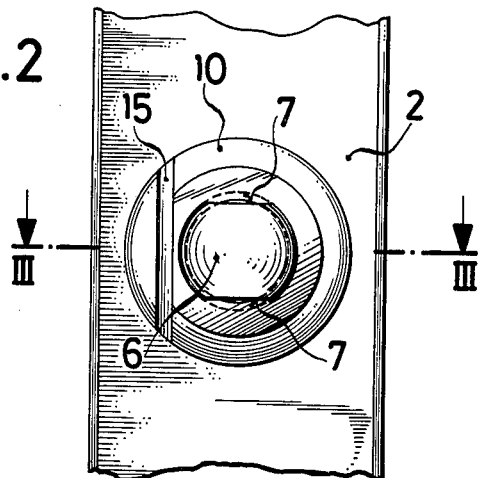
FIG. 2 is an enlarged detail elevational view of the scissors.
Figure 1:
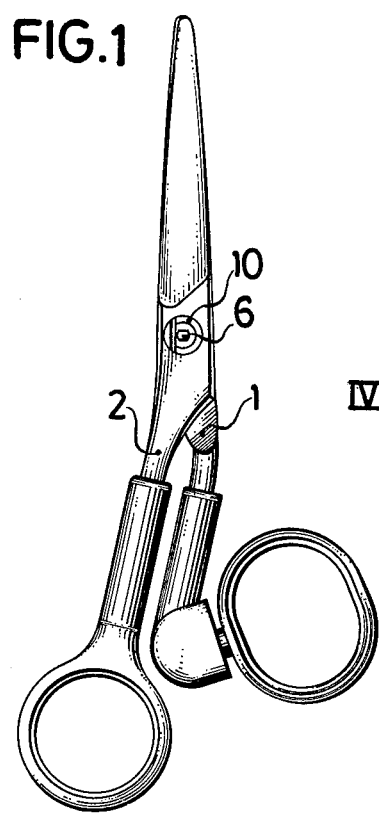
FIG. 1 is an elevational view of a hairdressers' scissors.
Figure 3:
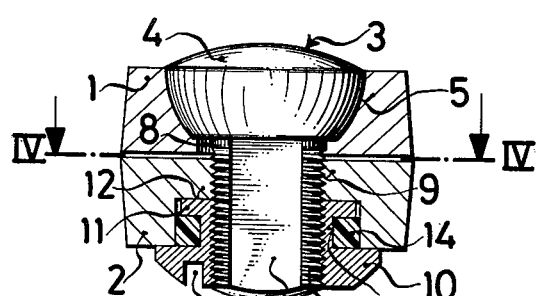
FIG. 3 is a section on the line III—III of FIG. 2.
Figure 4:
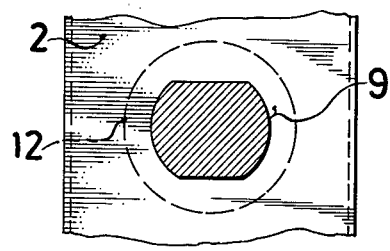
FIG. 4 is a section on the line IV—IV of FIG. 3.

FIG. 1 shows a hairdressers' scissors comprising a movable scissors blade 1 and a stationary scissors blade 2. The blades 1 and 2 are pivotally connected by means of a threaded pin 3 which consists of a head 4 and a shank 6. The head 4 of the threaded pin 3 is formed at its rear side spherically at its circumference and is seated with this portion in a cup-like recess 5 provided in the outer side of the movable scissors blade 1. The shank 6 of the threaded pin 3 has two flat surfaces 7 extending parallel to one another on diametrically opposite sides of the shank 6. The threaded pin 3 passes with its shank 6 through a hole 8 of the movable scissors blade 1 with clearance and through a hole 9 of the stationary scissors blade 2. The hole 9 of the stationary scissors blade 2 has on diametrically opposite sides flat surfaces which correspond to, and cooperate with, the flat surfaces 7 of the shank 6 of the threaded pin 3 so that the threaded pin 3 is non-rotatable in the stationary scissors blade 2. A threaded steel nut 10 is screwed on the free end of the threaded pin 3. The nut 10 comprises an axial projection 11 with which it fits into a circular recess 12 which is provided on the outer side of the stationary scissors blade 2 and extends coaxial with the hole 9 of the stationary scissors blade 2. The projection 11 of the nut 10 has an outwardly directed annular groove 13. An annular body 14 consisting of a resilient material is arranged in the annular groove 13 of the projection 11 of the nut 10 and engages the projection 11 and the wall of the circular recess 12 of the stationary scissors blade 2 with contact pressure. The nut 10 may have in its front side a groove 15 serving for receiving e.g. the blade of a screw driver, a pocket-knife or a file for the fingernails in order to turn and adjust therewith the nut 10.

The invention may be embodied in other specific forms without departing from the spirit or essential characteristics thereof. The embodiment is therefore to be considered in all respects as illustrative and not restrictive.

What is claimed is:

1. Scissors useful particularly by hairdressers, comprising
    (a) a movable scissors blade and a stationary scissors blade;
    (b) a pivotal connection connecting said movable scissors blade and said stationary scissors blade and consisting of a threaded pin having a shank, a head and a threaded steel nut provided with a projection formed with an annular groove extending over the periphery of the said projection, the threaded pin passing with its shank through a hole of the movable scissors blade and a hole of the stationary scissors blade and being non-rotatably held by one of the scissors blades;
    (c) a circular recess provided in the stationary scissors blade and defining a circular wall, said circular wall being arranged to guide the threaded steel nut via the projection thereof, and
    (d) an annular body consisting of resilient material which is arranged in said annular groove and engages the projection and the circular wall of the circular recess with contact pressure.

2. A scissors as set forth in claim 1, wherein a groove is provided in the front side of the nut.

* * * * *